(12) United States Patent
Schiavon et al.

(10) Patent No.: US 11,352,086 B2
(45) Date of Patent: Jun. 7, 2022

(54) PROCESS FOR MAKING SEATS WITH ADDITIONAL GEL PADDING, SEAT OBTAINED THEREWITH AND EQUIPMENT FOR IMPLEMENTING SAID PROCESS

(71) Applicant: Selle SMP SAS di M. Schiavon, Casalserugo (IT)

(72) Inventors: Franco Schiavon, Casalserugo (IT); Maurizio Schiavon, Padua (IT)

(*) Notice: Subject to any disclaimer, the term of this patent is extended or adjusted under 35 U.S.C. 154(b) by 84 days.

(21) Appl. No.: 15/733,153

(22) PCT Filed: Oct. 11, 2018

(86) PCT No.: PCT/IB2018/057885
§ 371 (c)(1),
(2) Date: May 29, 2020

(87) PCT Pub. No.: WO2019/106449
PCT Pub. Date: Jun. 6, 2019

(65) Prior Publication Data
US 2021/0362793 A1    Nov. 25, 2021

(30) Foreign Application Priority Data
Nov. 29, 2017   (IT) .................. 102017000137409

(51) Int. Cl.
*B62J 1/22*     (2006.01)
*B68G 7/00*    (2006.01)
*B29C 39/10*   (2006.01)
*B29D 99/00*   (2010.01)

(52) U.S. Cl.
CPC .............. *B62J 1/22* (2013.01); *B68G 7/00* (2013.01); *B29C 39/10* (2013.01); *B29D 99/0092* (2013.01)

(58) Field of Classification Search
CPC ........... B29C 37/0025; B29C 37/0028; B29C 37/0032; B29C 2037/0035; B29C 39/021; B29C 39/025; B29C 39/12; B29C 39/142; B29C 39/206; B29C 2043/144; B29C 43/146; B29C 2043/147; B29C 2043/149; B29C 43/18; B29C 43/183; B29C 43/184; B29C 2043/185; B29C 2043/186; B29C 2043/187; B29C 2043/188; B29C 43/20; B29C 43/34; B29C 33/565; B29C 63/025; B29C 66/436
See application file for complete search history.

(56) References Cited

FOREIGN PATENT DOCUMENTS

| DE | 102008020960 | 11/2009 |
|----|--------------|---------|
| EP | 1060859      | 12/2000 |
| EP | 1407867      | 4/2004  |
| TW | 201036858    | 10/2010 |

*Primary Examiner* — Stella K Yi
(74) *Attorney, Agent, or Firm* — Themis Law

(57) ABSTRACT

A process is disclosed for making seats, for example bicycle seats, which include at least one shell, at least one covering sheet or covering, and at least one gel padding element, which adheres to at least one intermediate adhesion sheet made of a material having micro holes or holes or a woven fabric, which in turn adheres to a surface of the at least one covering. Equipment configured to implement such process is also disclosed.

7 Claims, 5 Drawing Sheets

PROCESS FOR MAKING SEATS WITH ADDITIONAL GEL PADDING, SEAT OBTAINED THEREWITH AND EQUIPMENT FOR IMPLEMENTING SAID PROCESS

The present patent is related to seats and to the procedures for making them and in particular it concerns a new process for the realization of seats with additional gel padding and the resulting seat obtained. In particular, the new procedure is applicable for the production of bicycle seats.

The present patent also concerns the new seat or saddle obtained and the equipment to implement the process.

The seats in the prior art consist of a substantially rigid shell made of plastic material on which a covering is applied consisting of a flexible layer of leather or plastic material or fabric in general, and where normally there is padding between the shell and the cover, made of variable material, consistency and thickness according to the type of seat.

For example, this padding, or main padding, may be made of expanded polyurethane foam.

The prior art also comprises seats which are also equipped with additional gel padding, usually polyurethane.

The process of making seats or saddles with supplementary upper gel padding includes placing the leather or plastic cover in a reverse position in a female mould, reproducing the inverted shape of the padding, the extraction of the air between the mould and the covering, which then adheres to the mould itself, the placement of a quantity of gel compound in a liquid or semi-fluid state on the covering inside the mould, waiting for its partial solidification, the injection or the casting of the polyurethane material to be expanded, the closure with the upper male mould to which the shell of the seat is applied from the lower side, and finally the expansion of the polyurethane material, to create the main padding of the seat.

Currently seats are produced with special equipment in which a plurality of moulds, male and female, are applied on the perimeter of a generically circular and rotating structure. The rotation of this circular structure, or carousel, brings each mould to different successive stations, in each of which a single process is performed such as for example the placement of the covering, the insertion of the gel compound, the insertion of the polyurethane foam, the closure.

This process of producing seats with additional padding presents a series of drawbacks and limitations.

The additional gel padding can only be placed on the bottom of the mould, that is, on the upper part of the seat but it is not possible to place it in different points of the seat, for example on the sides or in the front because the gel compound slides to the bottom of the mould since the gel filling is in a fluid state and therefore self-levels.

After having cast the gel compound in the female mould, it is necessary to wait for an adequate period of time for the gel to set at least partially, before introducing the polyurethane foam and making it expand. This entails a slowing down of the carousel and of all the operations to construct the seat or, alternatively, requires a larger carousel and/or increasing the distance between the position in which the gel is applied and the position in which the polyurethane foam is applied on the circumference of the rotating structure.

In any case, the time necessary for the partial or complete drying of the gel slows down the production time for all of the seats.

The prior art comprises a method which allows the gel to also be positioned on the vertical sides, on the edges, and on the front end of seats. According to this method, the gel is placed and cured directly on the extended covering ahead of time, only at the desired points, for example on the vertical side edges, at the centre, with either uniform or different thicknesses.

Subsequently to the partial or complete setting of the gel, the covering, equipped with the gel padding, is positioned in the mould with the shell, for the moulding of the expanded polyurethane foam padding.

In particular, the mould is for example equipped with a concavity with a multitude of holes connected to a suction system to make the covering adhere to the concavity, and where the expansion of the polyurethane foam, previously introduced onto the covering, takes place between the covering and the shell.

The gel can also be conveniently placed up to the lower edge of the seat, thus providing not only a support for the ischial bone but also a contact plane with the internal parts of the moving limbs.

This procedure is the subject of Italian patent 1335447 by the same applicant.

The present invention relates to a new process for the production of seats, and in particular bicycle seats, with additional gel padding and the seat obtained, which achieve certain advantages with respect to the prior art.

The main object of the new procedure is creating one or more additional gel pads, having shapes and positions that remain unchanged over time and also during use of the seat.

Another object of the present invention is to provide a seat having one or more additional gel pads shaped and positioned on the inner face of the covering, that is, on the side destined to face the shell.

The seat produced according to the new process is therefore provided with one or more additional gel pads, where the one or more additional pads maintain their original shape and position even during use.

In the particular case in which this seat is a bicycle seat, the new procedure allows the gel padding to be placed up to the lower edge of the seat, substantially corresponding to the side edges of the shell, and where the padding remains correctly positioned even during use, so that the inner part of the user's limbs remain in contact with the surface padding.

The new procedure basically includes the following steps:
preparation of at least one covering sheet or covering, for example comprising a flexible sheet of leather or fabric or polymeric material;
cutting to size of one or more intermediate adhesion sheets, where the adhesion sheets have a shape and size preferably corresponding to the shape and dimensions of one or more additional gel pads to be made, and where the sheets are made of material with micro-holes or woven fabric;
application and bonding of the one or more adhesion sheets on the inner surface of the at least one covering, that is, the surface intended to be facing the inside of the seat, and where the adhesion sheets are applied on the cover in the positions where the one or more additional pads must be created;
positioning of the at least one covering with the adhesion sheets applied in a first mould shaped with one or more concavities for the realization of the one or more additional pads;
casting of gel onto the intermediate adhesion sheets, where the gel penetrates into the micro-holes or holes in the weft of the adhesion sheets, and forming of the additional pads.

Said one or more gel pads are therefore integral with the adhesion sheets and, thus, with the covering.

Similarly to the known processes in the prior art, the at least one covering, with one or more adhesion sheets and additional applied pads, can then be positioned inside a second mould, with a shell, and where in the second mould the injection or the casting of the polymeric material is then performed and the subsequent expansion of the main padding between the at least one covering and the at least one shell, so that the one or more additional pads are interposed between said main padding and said covering.

The new seat or saddle thus obtained comprises at least one shell, at least one covering sheet or covering, at least one main foam padding between said shell and said covering, at least one additional gel pad, and where said at least one additional pad is integral with at least one intermediate adhesion sheet in turn applied integrally to the surface of said covering facing the inside of the seat.

Said adhesion sheet ensures the adhesion of the gel, preventing unwanted shifting. Said intermediate adhesion sheet, applied on the cover, further ensures that the gel remains stably positioned also with respect to said cover, once the seat is assembled and also during its use.

The present patent also relates to the apparatus to carry out the new process, which comprises a first mould to form one or more additional gel pads and a second mould for the final expansion steps of a main pad and the bonding of a cover on a shell.

In one embodiment, this apparatus comprises a carousel or rotary structure supporting a plurality of the second moulds and which, by rotating, brings each mould to different successive stations, in each of which a single process is performed, namely: placement and positioning of the cover with adhesion sheets and additional pads, insertion of the polyurethane foam, positioning of the shell, closing of the mould, expansion of the foam and forming of the seat.

Alternatively, said apparatus comprises a plurality of said second moulds mounted on a fixed structure.

The characteristics of the new process and of the seat produced with the new procedure will be better explained by the following description with reference to the drawings, enclosed by way of a non-limiting example.

FIG. 1 shows a first part of the seat manufacturing process, while

The new seat is obtained by cutting to size one or more intermediate adhesion sheets (A) made, for example, of material with micro holes or woven fabric.

Said adhesion sheets (A) are applied and in any case bonded, for example glued, onto a surface (C1) of at least one covering sheet or covering (C), which is in turn pre-cut to size. Said adhesion sheets (A) are applied in predefined positions, for example as in FIG. 3, so as to be symmetrically arranged on the two sides of the seat to be obtained.

Figure 1:
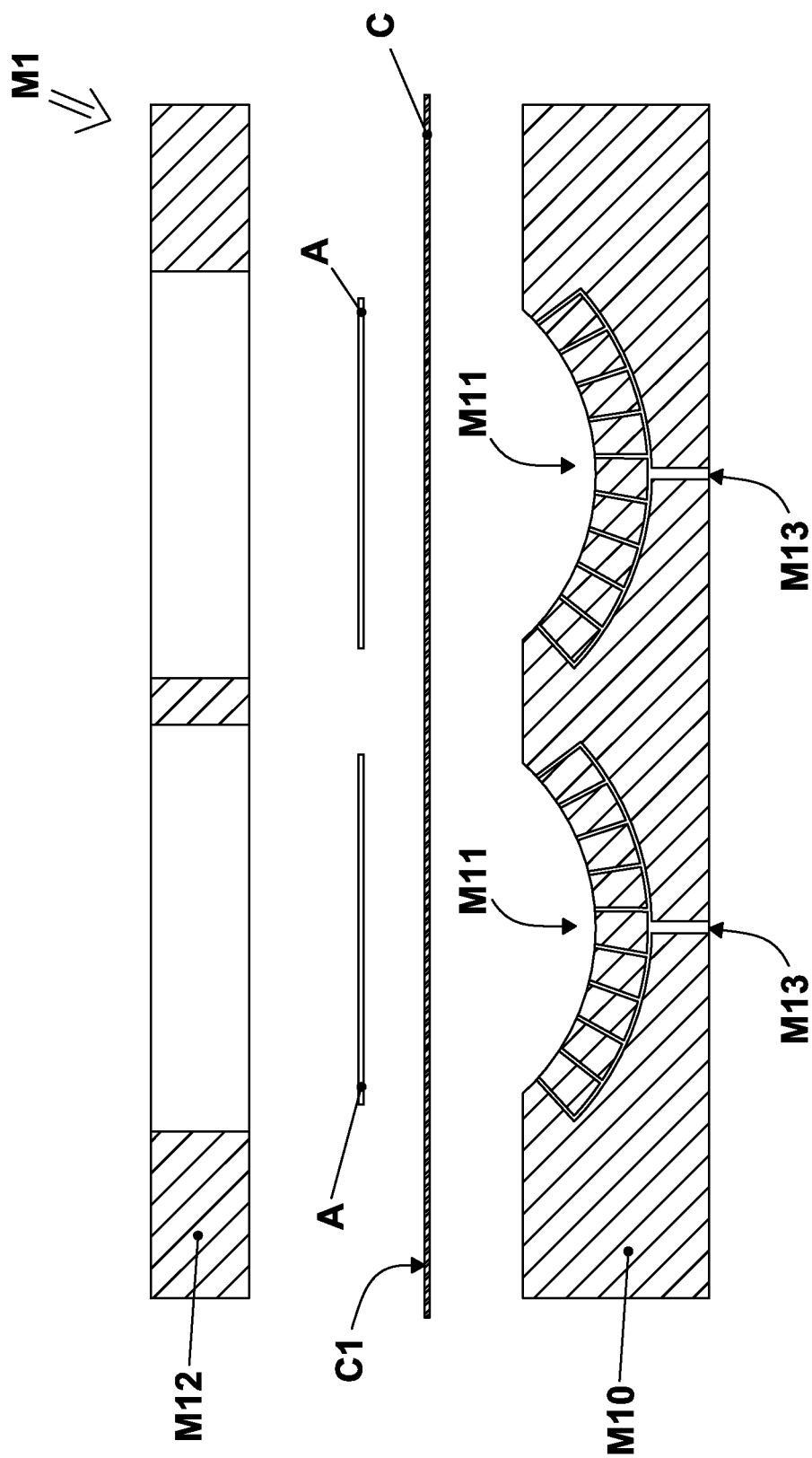
Figure 2:
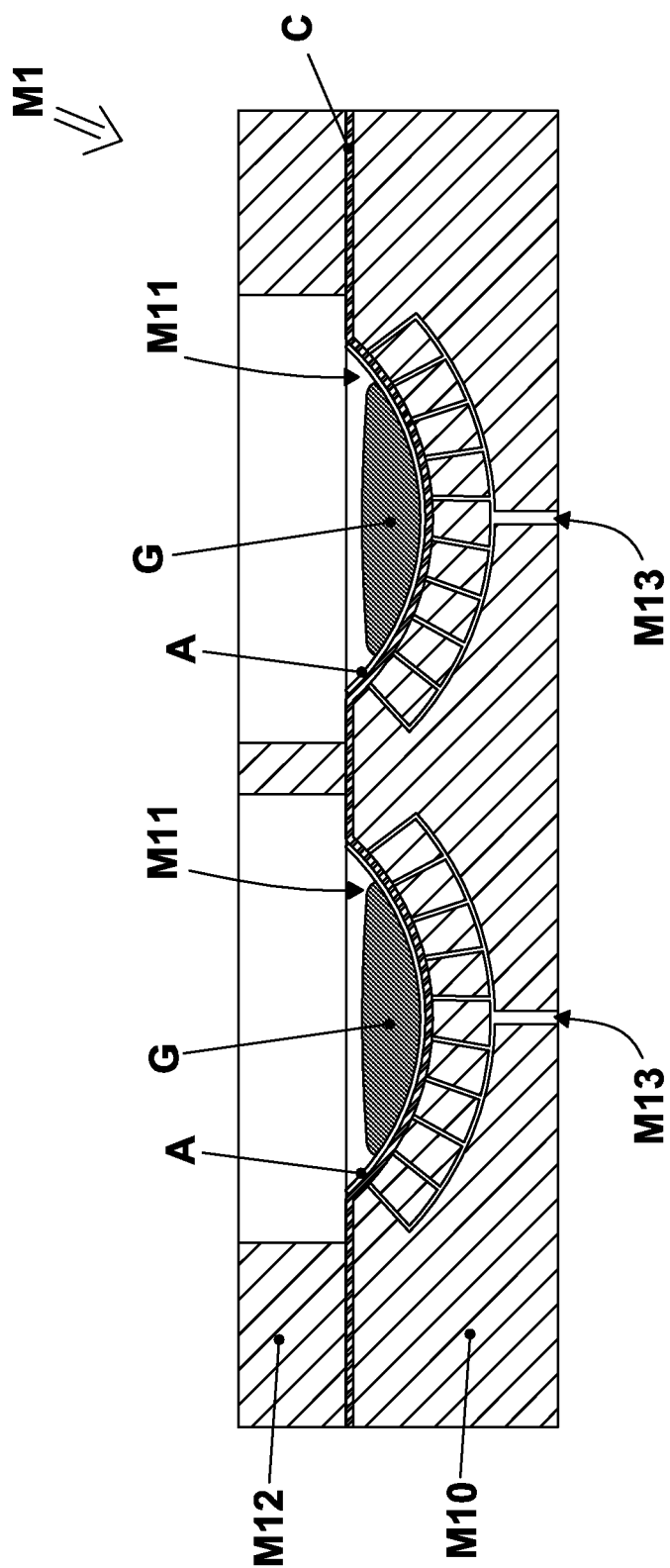
FIG. 2 shows the manufacturing step of two additional padding elements (G) made of gel in a first mould (M1).

FIGS. 1 and 2 show a first mould (M1) according to a first embodiment, comprised of a female half-die (M10) and a locking plate (M12).

Said female half-die (M10) has one or more concave portions (M11), each corresponding substantially to an additional padding element (G) to be created in the seat, as described and claimed below.

Said covering (C) with adhesion sheets (A) is placed upside down on the female half-die (M10) through the use of possible centering means.

Said female half-die (M10) also comprises ducts (M13) connected to an air intake system from inside the female half-die (M10) itself.

By means of said aforementioned suction system, the air is sucked through said ducts (M13), so that the covering (C) adheres to the walls of said female half-die (M10) and said one or more concave portions (M11).

Said locking plate (M12) is then positioned on said female half-die (M10) to keep the covering (C) still during the subsequent injection or casting of the gel in said one or more concave portions (M11) to make one or more additional gel padding elements (G).

In particular, on each of said adhesion sheets (A) a certain quantity of gel is cast and at least partially set, which penetrates the micro-holes or into the weft of the adhesion sheets (A), to create an additional padding element (G) of a predetermined shape and size which is integrally constrained to the corresponding adhesion sheet (A) in turn having a predefined shape and size.

Figure 3:
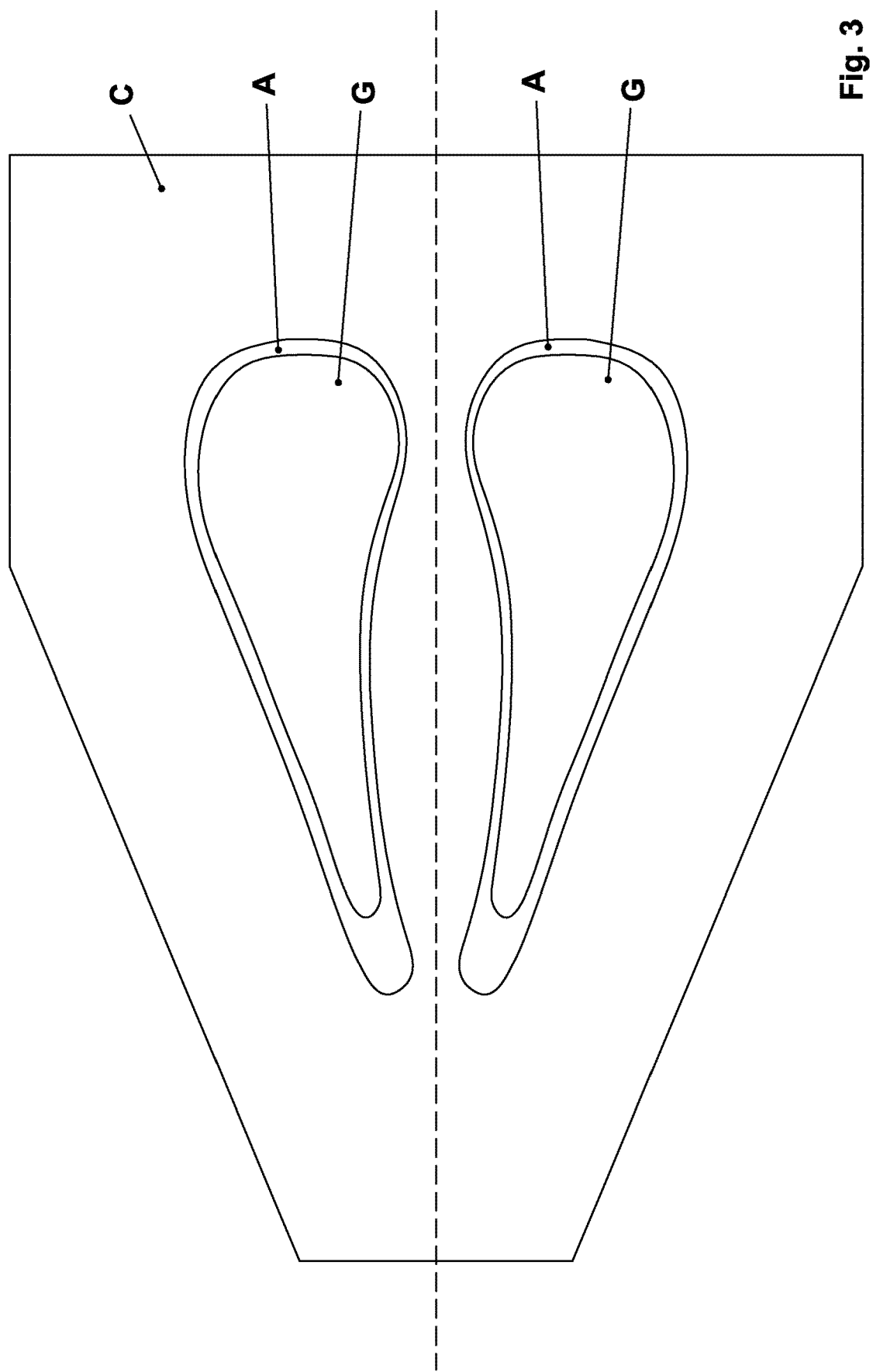
FIG. 3 shows a possible embodiment of a covering (C) to make a bicycle seat, where two specular adhesion sheets (A) and two additional gel padding elements (G) are applied on said adhesion sheets (A), with a corresponding shape and also specular to each other.

From these initial steps of the process, when the gel is properly set after a certain period of time a covering (C) is obtained as shown in FIG. 3, with said adhesion sheets (A) integrally bonded to said additional padding elements (G) applied.

The new process comprises further steps which provide for the positioning of said covering (C), together with said adhesion sheets (A) and said additional padding elements (G) applied, in a second mould (M2), in turn comprised of two half-dies (M20, M22): a female half-die (M20) and a male half-die (M22).

Said female half-die (M20) has one or more concave portions (M21) and ducts (M23) connected to an air intake system. Said female half-die (M20) is suited to house said covering (C) upside down, so that said adhesion sheets (A) and said additional padding elements (G) are facing the inside of the mould (M2).

By means of said aforementioned suction system, the air is sucked through said ducts (M23) so that said covering (C) adheres to the walls of said female half-die (M20).

Figure 4:
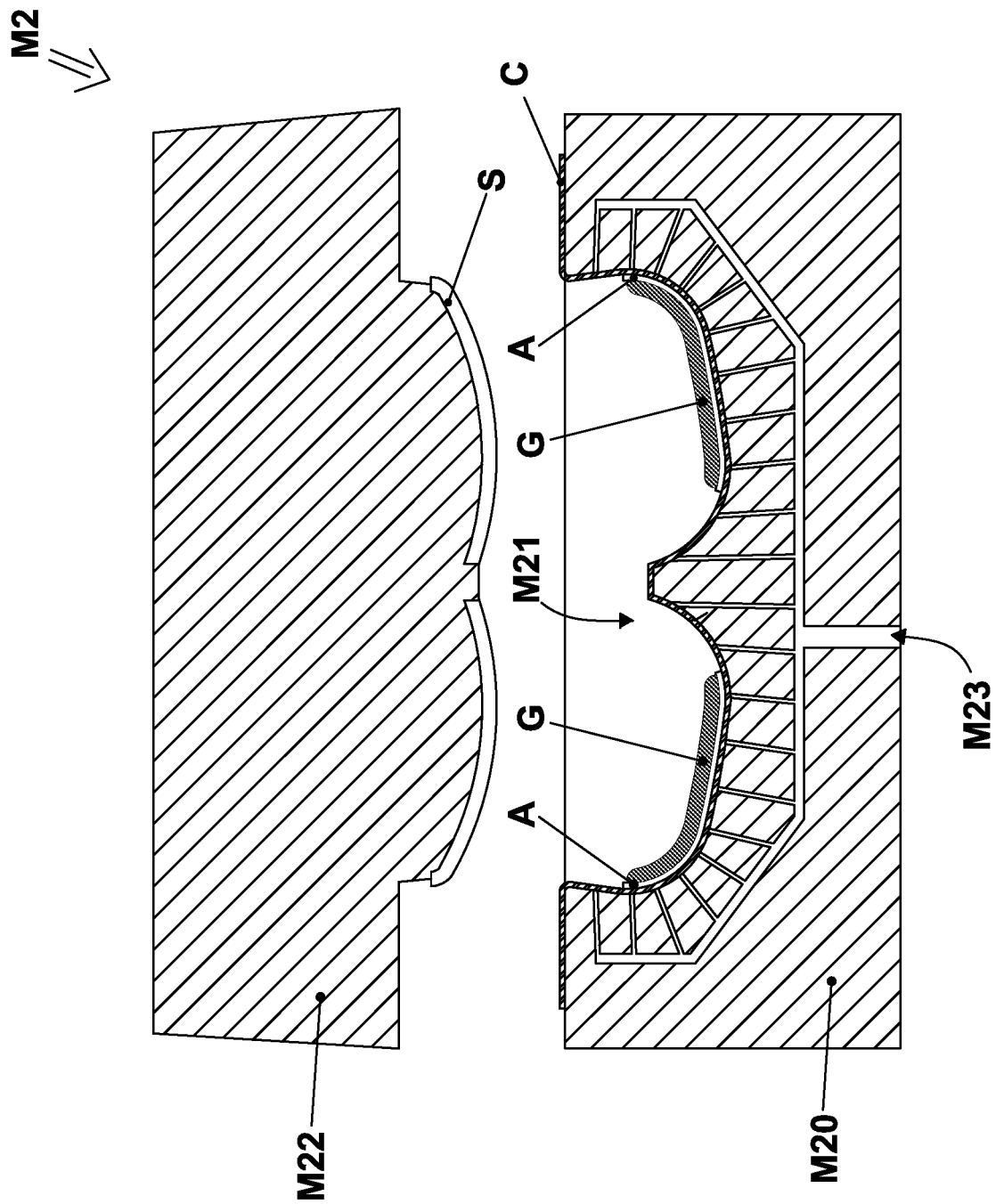
FIG. 4 shows a diagram of the second part of the process where the covering of FIG. 3, with adhesion sheets (A) and additional padding elements (G) applied, is placed in a second mould (M2).
Figure 5:
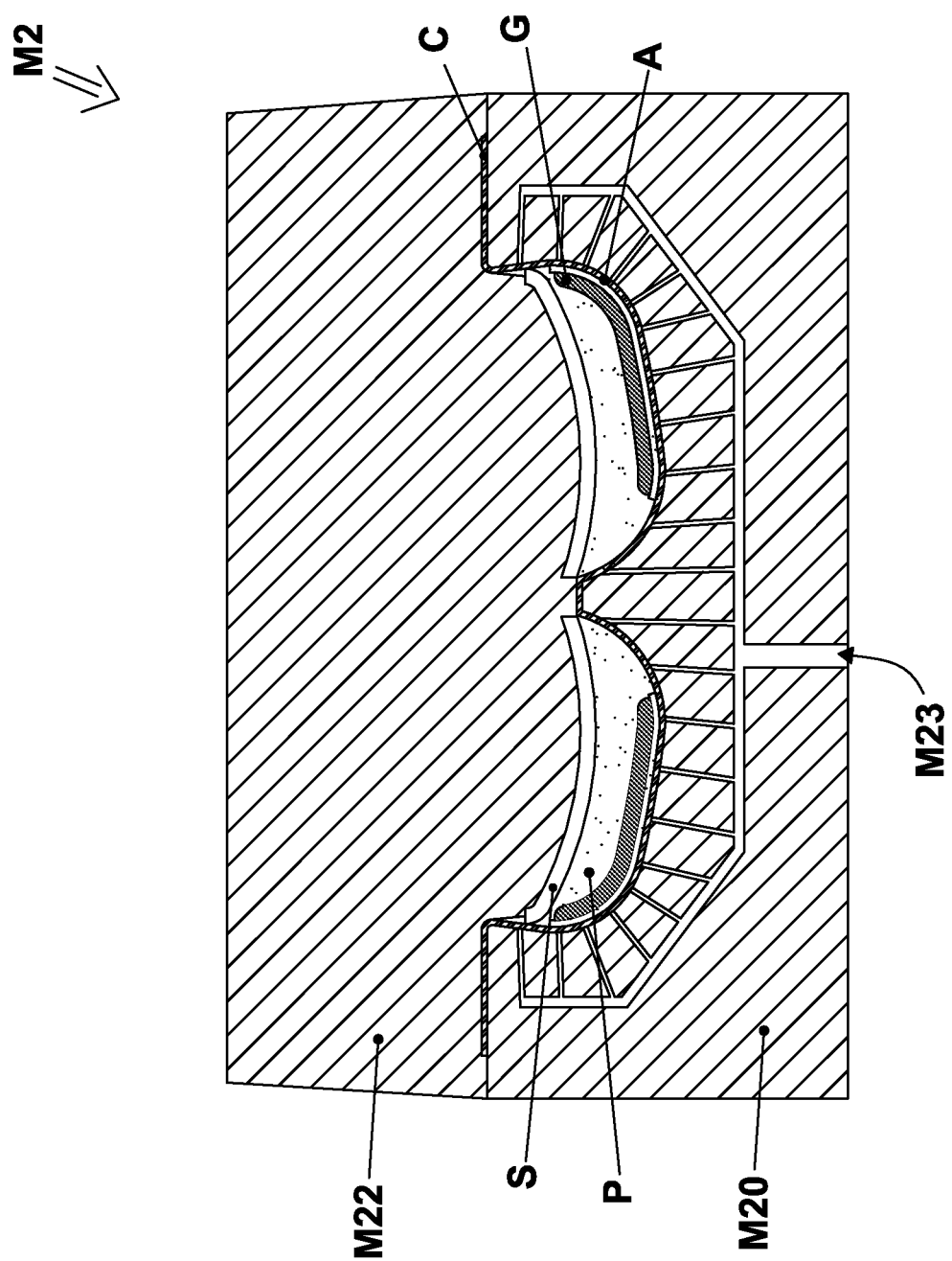
FIG. 5 shows a diagram of the second mould (M2) closed, in which the polymer material (P) expands for the final moulding of the seat.

Said male half-die (M22) is configured so as to hold a shell (S), so that, when the second mould (M2) is closed as shown in FIG. 4, a space is created for the expansion of the polyurethane material used for the main padding (P) of the seat between said shell (S) and said covering (C) with said additional padding elements (G) applied.

The seat thus obtained comprises at least one shell (S), at least one covering (C) and at least one additional gel padding element (G), where said at least one additional gel padding element (G) is bonded to at least one intermediate adhesion sheet (A), in turn bonded to a surface (C1) of said at least one covering (C).

In particular, said adhesion sheet (A) with said at least one additional gel padding element (G) applied is bonded to the surface (C1) of said at least one covering (C) facing the shell (S).

The new seat also comprises at least one main padding (P) made of polyurethane material located between said at least one shell (S) and said at least one covering (C). Said seat is suitably designed to be a bicycle seat.

The equipment to carry out the above described procedure comprises a first mould (M1) with means for casting the gel into the concave portions (M11) of the mould (M1) itself, used to make one or more additional gel padding elements (G), and a second mould (M2) for the final stages of the polyurethane foam expansion of the main padding (P) and the bonding of the covering (C) on a shell (S).

In one possible embodiment, the equipment comprises a carousel or rotary structure supporting a plurality of said second moulds (M2), not shown in the figures, the rotation of which, moves each second mould (M2) to different processing stations or steps, where a single process is carried out, namely: placement and correct positioning of said covering (C) together with the adhesion sheets (A) and the additional padding elements (G) applied thereto, the introduction of the polyurethane material, positioning of the shell (S), closure of said second mould (M2), expansion of the polyurethane material and the final moulding of the seat.

Alternatively, the second moulds may not be mounted on a movable structure but on a fixed structure, for example on a workbench.

The equipment above further comprises at least one first system for sucking the air from the inside of said first mould (M1), to ensure the correct positioning of the covering (C) with said one or more adhesion sheets (A) applied before the gel is cast.

A further suction system is connected to one or more of said second moulds (M2), for the suction of the air from inside said second moulds (M2), to ensure the correct positioning of said covering (C), together with said additional padding elements (G) applied on said adhesion sheets (A), before the polyurethane material to be expanded is cast.

These specifications are sufficient for the expert person to make the invention, as a result, in the practical application there may be variations without prejudice to the substance of the innovative concept.

Therefore, with reference to the preceding description and the attached drawings the following claims are made.

The invention claimed is:

1. A process of making seats comprising a shell (S), a covering (C), and an additional gel padding element (G), comprising:
    preparing the covering (C);
    cutting to size an intermediate adhesion sheet (A) made of a material provided with micro holes or a woven fabric;
    applying said intermediate adhesion sheet (A) onto a surface (C1) of said covering (C) in a stable manner, in a position in which said additional padding element (G) must be made;
    positioning said covering (C), together with said intermediate adhesion sheet (A) applied thereon, into a first mold (M1) shaped so that it is provided with one or more concave portions (M11) for creation of said additional gel padding element (G); and
    casting a given quantity of gel onto said intermediate adhesion sheet (A), wherein the gel penetrates into said micro holes or holes present in the woven fabric of said intermediate adhesion sheet (A) so as to form said additional gel padding element (G) having a predetermined shape and size, wherein said additional gel padding element (G) remains adherent to said intermediate adhesion sheet (A).

2. The process according to claim 1, further comprising:
    removing said covering (C), together with said intermediate adhesion sheet (A) and said additional padding element (G), from said first mold (M1) and positioning said covering (C), said intermediate adhesion sheet (A) and said additional gel padding element (G) inside a second conveniently shaped mold (M2); and
    positioning said shell (S) inside said second mold (M2), wherein a casting and the successive expansion of a material forming a main padding element (P) between said covering (C) and said shell (S) is carried out in said second mold (M2), in such a way that said additional gel padding element (G) is interposed between said main padding element (P) and said covering (C).

3. The process according to claim 1, wherein casting a given quantity of gel comprises causing said additional gel padding element (G) to adhere to said intermediate adhesion sheet (A), and further comprises causing said intermediate adhesion sheet (A) to adhere to a surface (C1) of said covering (C).

4. The process according to claim 1, wherein causing said intermediate adhesion sheet (A) to adhere adheres to said surface (C1) of said covering (C) comprises causing said intermediate adhesion sheet (A) to adhere adheres to said surface (C1) of said covering (C) facing toward said shell (S).

5. The process according to claim 1, wherein a shape and a size of said intermediate adhesion sheet (A) substantially corresponds to a shape and a size of said additional gel padding element (G).

6. The process according to claim 4, further comprising arranging a main padding element (P) made from a foam material between said shell (S) and said covering (C).

7. The process according to claim 1, wherein said shell is configured as a bicycle seat.

* * * * *